Patented Aug. 11, 1942

2,292,808

UNITED STATES PATENT OFFICE 2,292,808

MANUFACTURE OF HETEROCYCLIC COMPOUNDS

Henry C. Waterman and Donald L. Vivian Washington, D. C.

No Drawing. Application August 23, 1940, Serial No. 353,890

52 Claims. (Cl. 260—267)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This is a continuation in part of our copending application for patent, Serial No. 315,388, filed January 24, 1940.

This invention relates to improvements in the manufacture of heterocyclic compounds which contain at least one nitrogen atom in a heterocyclic ring, including substitution products thereof, with the advantage of making such manufacture more expeditious and considerably cheaper than has been possible heretofore.

Our invention embraces the discovery of a new type reaction, and the employment of this reaction in the synthesis of various heterocyclic compounds having at least one nitrogen in a heterocyclic ring. One of the advantages of our method is that by its use one or more complete operations in the previous methods of making some of these compounds have been eliminated, thereby reducing production costs.

Other advantages of our invention are that good yields are generally obtained, which are easily and inexpensively recovered from the reaction mixtures.

Heretofore one of the most expeditious methods for the manufacture of some of the compounds covered by our invention was to oxidize, as by lead oxide, an amino compound in which the amino group was ortho to a bridge-linkage. By bridge-linkage we mean the linkage which joins two carbon-containing radicals, in such fashion that when the heterocyclic ring is closed, this linkage becomes part of the newly-formed heterocyclic ring. Such a linkage may be any of a number of linkages, including a direct bonded linkage, such as

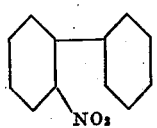

or a linkage containing one or more atoms, such as

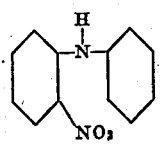

The synthesis of phenazine, one of the compounds covered by this specification, thus was accomplished heretofore by treating ortho-aminodiphenylamine with lead oxide at a moderately high temperature, whereupon the heterocyclic ring was closed through the nitrogen atom of the previously existing amino group, and the nitrogen atom which linked the two carbon-containing radicals together in the $$-\overset{H}{\underset{}{N}}-$$

"bridge-linkage" became part of the newly formed heterocyclic ring.

We have found that it is unnecessary to form first the ortho-amino compound, and that it is possible by using a suitable oxygen acceptor to form the heterocyclic compounds directly from the corresponding ortho-nitro-compounds. This eliminates one whole operation, thereby making the manufacture of the heterocyclic compounds considerably cheaper.

In general, our invention comprises reacting a compound containing a nitro group ortho to a bridge-linkage with a suitable oxygen acceptor at moderately high temperatures in a dry state, or in an inert solvent which does not furnish hydrogen to the reaction. The expression "dry state" is to be understood as meaning without water, except what may be present normally in the chemicals used. A small amount of water has been found not to inhibit the reaction. In general, the oxygen acceptor must be one that will not aminize the nitro radical, that is, it will not furnish hydrogen to yield an organic amine. This results in closing the heterocyclic ring, converting the ortho-nitro-compounds to the corresponding heterocyclic one. We have found that suitable oxygen acceptors for this reaction are metals, such as aluminum, antimony, cobalt, copper, iron, magnesium, lead, nickel, tin, and zinc; and nonmetals, such as carbon, phosphorus, and sulfur. Mixtures, alloys, and amalgams of two or more of the metals may also be used. It is possible, with proper care, to use such very active metals as sodium, either in the form of a low-percentage amalgam, or in a form such as lead-sodium alloy, or with a solid or liquid inert diluent.

We have also found that certain metallic oxides in which the metal is present in a lower state of oxidation, such as chromous oxide, ferrous oxide, and lead suboxide, are capable of acting as oxygen acceptors. In general, our invention can be brought about by any of a large number of substances which act as reducing agents at moderately high temperatures by accepting oxygen to effect the general reaction:

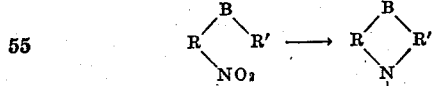

in which R and R' are radicals containing carbon, at least one of which is cyclic, —B— is a bridge-linkage between the two carbon radicals, being either a direct linkage between carbon atoms of the two radicals or a linkage through another atom (such atom may itself be carbon) or any other atom capable of forming a relatively stable bond, and in which the —NO₂ group is in the ortho-, or 2-position, relative to the bridge-linkage.

In practice, an intimate mixture is made of the 2-nitro compound with the oxidizable material. The whole mass is then heated to a temperature at which the reaction sets in. In the cases where the reaction product sublimes undecomposed, the reaction mixture may be heated strongly enough to sublime all of the product formed. If desired, in the case of the sublimable products, and of necessity where the products are decomposed by too much heat, or are not sublimable, the reaction mixture may be kept at a temperature just high enough to complete the reaction, and the product may be extracted after the mixture has cooled by a suitable solvent, such as acetone, toluene, chloroform, alcohol, and so forth, the solvent chosen being suitable for the particular compound being manufactured.

We have found that various substituents present in either or both of the carbon containing radicals joined by the bridge-linkage do not interfere with the reaction. Thus alkyl, aryl, alkoxy, halogen, nitro, and amino groups do not prevent the reaction, provided that there is a free ortho- or 2-position through which the heterocyclic ring may be closed. However, while in all other cases a substituted heterocyclic compound results, in the case of those intermediates which have an amino group or a second nitro group in the ortho- or 2-position relative to the bridge-linkage, nitrogen may be lost in the reaction, so that the resulting heterocyclic compound consequently will not have a nitro-group substituted in the corresponding position; instead, the second bridge-linkage occupies the place vacated by the eliminated nitro-group.

The following examples will further clarify our invention:

*Example 1.*—5 grams of o-nitrodiphenylamine was intimately mixed with 25 grams of iron filings and heated at a temperature of about 250° to 350° C. for ten to fifteen minutes. Upon completion of the reaction, the phenazine was sublimed out of the mixture. This sublimate was nearly pure phenazine and represented a yield of approximately 73 percent of the theoretically obtainable maximum. The reaction is indicated as follows:

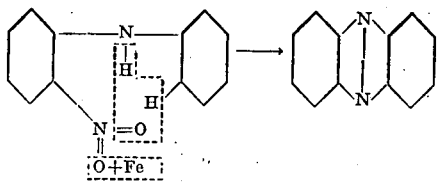

*Example 2.*—1 gram of 4'-chloro-2-nitrodiphenylamine was intimately mixed with 5 grams of iron filings and the mixture heated at a temperature of about 250° to 350° C. for about ten minutes. The reaction yielded about 50 percent of the theoretical maximum of 2-chlorophenazine.

*Example 3.*—5 grams of 2'-chloro-2-nitrodiphenylamine was intimately mixed with 25 grams of lead shavings and heated at a temperature of about 225° to 300° C. for ten to fifteen minutes. The reaction yielded a sublimate of 1-chlorophenazine in the amount of approximately 75 percent of the theoretical maximum.

*Example 4.*—1 gram of 4'-methoxy-2-nitrodiphenylamine was intimately mixed with 4 grams of carbon in the form of activated charcoal and heated at a temperature of 250° to 400° C. for about ten minutes. 10 cc. of acetone was then added to the reaction mixture and the carbon filtered out. The acetone was then evaporated from the filtrate. It was found that approximately a 50 percent yield of the theoretical maximum of 2-methoxyphenazine was obtained.

*Example 5.*—2 grams of 2-2'-dinitrodiphenylamine was intimately mixed with 20 grams of iron filings and the mixture heated at a temperature of 250° to 350° C. for about fifteen minutes. This reaction yielded a sublimate of unsubstituted phenazine of about 30 percent of the theoretical maximum.

*Example 6.*—1 gram of 4'-methyl-2-nitrodiphenylamine was intimately mixed with 5 grams of slightly amalgamated aluminum powder, and the whole subjected to a temperature of about 250° C. for about 15 minutes. On cooling and extracting with chloroform there was obtained about 60 percent yield of the theoretical quantity of 2-methylphenazine.

*Example 7.*—25 grams of ferrous oxalate were added to 5 grams of 2-nitrobiphenyl and an intimate mixture made. The mixture was placed in a reaction vessel and the temperature was raised to about 220° C. Quantities of pure carbazole began to sublime out of the mixture. The mixture was held at about the same temperature for about 15 minutes, and then allowed to cool. The sublimated carbazole collected in the cooler part of the reaction vessel, and this was combined with unsublimated carbazole, which had been retained in the reaction mixture, by adding hot toluene, which dissolved both the sublimated and unsublimated carbazole, and filtering off the inorganic material. Upon chilling the solvent carrier, there was obtained pure carbazole in an amount representing an 80 percent yield. The reaction is represented as follows:

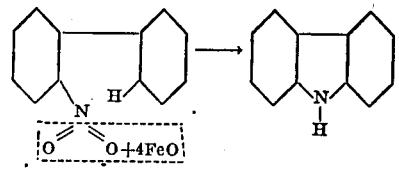

*Example 8.*—One gram of 9-(o-nitrophenyl)-carbazole was mixed with 5 grams of ferrous oxalate as above. The mixture was heated to about 225° C. for about 15 minutes, cooled, and the mixture extracted with hot chloroform. Upon filtering and evaporating the solvent, there was obtained 1,9-dihydrophenazinocarbazole, the yield being about 40 percent. The reaction is represented as follows:

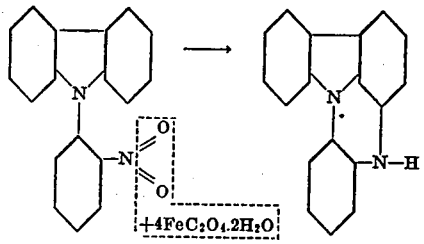

*Example 9.*—1 gram (2-nitrophenyl)-1-naphthylamine was mixed with 5 grams of reduced iron ("ferrum reductum") and the mixture held at a temperature of about 240° C. for about fifteen minutes, then cooled and extracted with acetone. Evaporation of the solvent after filtering gave about 50 percent of the theoretical yield of 1,2-benzophenazine. The reaction is represented as follows:

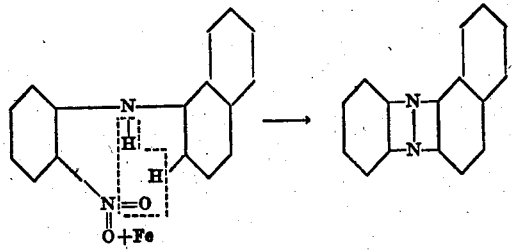

Example 10.—0.5 of a gram of o-nitrodiphenyl ether was heated to about 150° C. with 5 grams of 8 percent sodium amalgam. A violent reaction ensued. From the reaction mixture a measurable quantity of phenoxazine was isolated by treatment with alcohol.

Example 11.—1 gram of o-nitrodiphenylmethane was heated with 5 grams of iron filings in a sealed tube at a temperature of about 225° C. The reaction mixture contained a good yield of acridine which was isolated by solvents.

Example 12.—A mixture of Fe and FeO ("pyrophoric iron") was prepared by heating 5 grams of ferrous oxalate to about 225° C. This mixture was cooled to about 180° C. substantially in the absence of oxygen and 1 gram of o-nitroacetanilide was added thereto. The whole was then brought to a temperature of about 220° C., which resulted in the formation of 2-methylbenzimidazole, the yield being about 40 percent.

The above described procedures may be modified by adding an inert material as a diluent, such as asbestos, fuller's earth, sand, and so forth, to moderate the flow of heat through the mass where such moderation may be desired, such as in large scale operations.

Having thus described our invention, we claim:

1. The method of manufacturing a heterocyclic compound of the class

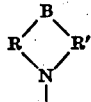

in which R and R' are aromatic nuclei and —B— is a bridge linkage connecting said radicals, which method comprises thermally reacting a nitro compound of the class

with an oxygen acceptor under such conditions that hydrogen is not furnished to the reaction until the heterocyclic compound is formed, thence recovering the said heterocyclic compound.

2. The method of manufacturing a heterocyclic compound of the class

from a nitro compound of the class

in both of which compounds R and R' are aromatic nuclei, which comprises thermally reacting the nitro compound with an oxygen acceptor under such conditions that hydrogen is not furnished to the reaction until the heterocyclic compound is formed, thence recovering the heterocyclic compound.

3. The method of converting an organic nitro compound having an uncompleted heterocyclic ring containing a bridge linkage between an aromatic nucleus bearing the nitro radical in a position ortho to said bridge linkage and a member chosen from the group consisting of aromatic and carboxylic acyl radicals, to the corresponding compound having the heterocyclic ring completed, which method comprises thermally reacting the initial compound with an oxygen acceptor under such conditions that hydrogen is not furnished to the reaction until the completed heterocyclic ring is formed, thence recovering the heterocyclic compound.

4. The method of manufacturing a heterocyclic compound of the class

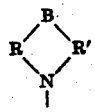

from a nitro compound of the class

in both of which compounds R and R' are aromatic nuclei and —B— is a bridge linkage connecting said radicals, which method comprises heating the nitro compound with a metal chosen from the group consisting of aluminum, antimony, cobalt, copper, iron, lead, magnesium, nickel, tin, zinc, and sodium under such conditions that hydrogen is not furnished to the reaction until the heterocyclic compound is formed, and thence recovering the heterocyclic compound.

5. The method of manufacturing a heterocyclic compound of the class

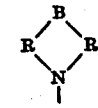

from a nitro compound of the class

in both of which compounds R and R' are aromatic nuclei and —B— is a bridge linkage connecting said radicals, which method comprises heating the nitro compound with carbon until the heterocyclic compound is formed, and thence recovering the heterocyclic compound.

6. The method of manufacturing a heterocyclic compound of the class

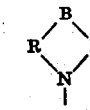

from a nitro compound of the class

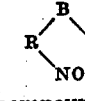

in both of which compounds R and R' are aromatic nuclei and —B— is a bridge linkage connecting said radicals, which method comprises heating the nitro compound with phosphorous until the heterocyclic compound is formed, and thence recovering the heterocyclic compound.

7. The method of manufacturing a heterocyclic compound of the class

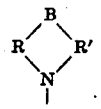

from a nitro compound of the class

in both of which compounds R and R' are aromatic nuclei and —B— is a bridge linkage connecting said radicals, which method comprises heating the nitro compound with sulfur until the heterocyclic compound is formed, and thence recovering the heterocyclic compound.

8. The method of manufacturing a heterocyclic compound of the class

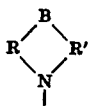

from a nitro compound of the class

in both of which compounds R and R' are aromatic nuclei and —B— is a bridge linkage connecting said radicals, which method comprises heating the nitro compound with ferrous oxalate under such conditions that hydrogen is not furnished to the reaction until the heterocyclic compound is formed, and thence recovering the heterocyclic compound.

9. The method of manufacturing a heterocyclic compound of the class

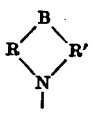

from a nitro compound of the class

in both of which compounds R and R' are aromatic nuclei and —B— is a bridge linkage connecting said radicals, which method comprises heating the nitro compound with a mixture of iron and ferrous oxide under such conditions that hydrogen is not furnished to the reaction until the heterocyclic compound is formed, and thence recovering the heterocyclic compound.

10. The method of manufacturing a heterocyclic compound of the class

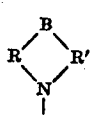

in which R and R' are aromatic nuclei and —B— is a bridge linkage connecting said radicals, which method comprises thermally reacting in the presence of an inert diluent a nitro compound of the class

with an oxygen acceptor under such conditions that hydrogen is not furnished to the reaction until the heterocyclic compound is formed, thence recovering the said heterocyclic compound.

11. The method of manufacturing a heterocyclic compound of the class

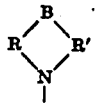

from a nitro compound of the class

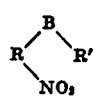

in both of which compounds R and R' are aromatic nuclei and —B— is a bridge linkage connecting said radicals, which method comprises heating the nitro compound with chromous oxide, under such conditions that hydrogen is not furnished to the reaction until the heterocyclic compound is formed, and thence recovering the heterocyclic compound.

12. The process of manufacturing a heterocyclic compound chosen from the group consisting of Phenazine
    2-methoxyphenazine
    1-chlorophenazine
    2-methylphenazine
    Carbazole
    1,9-dihydrophenazinocarbazole
    1,2-benzophenazine
    Phenoxazine
    Acridine
    2-methylbenzimidazole from the corresponding nitro compound chosen from the group consisting of o-Nitrodiphenylamine
    4'-methoxy-2-nitrodiphenylamine
    2-nitrodiphenylamine
    2'-chloro-2-nitrodiphenylamine
    4'-methyl-2-nitrodiphenylamine
    2-nitrobiphenyl
    9-(o-nitrophenyl)-carbazole
    (2-nitrophenyl)-1-naphthylamine
    o-Nitrodiphenyl
    o-Nitrodiphenylmethane
    o-Nitroacetanilide, respectively, which method comprises heating the nitro compound with an oxygen acceptor under such conditions that hydrogen is not furnished to the reaction until the corresponding heterocyclic compound is formed, and thence recovering the heterocyclic compound.

13. The process of manufacturing a heterocyclic compound chosen from the group consisting of Phenazine
    2-methoxyphenazine
    1-chlorophenazine
    2-methylphenazine
    Carbazole
    1,9-dihydrophenazinocarbazole
    1,2-benzophenazine
    Phenoxazine
    Acridine
    2-methylbenzimidazole from the corresponding nitro compound chosen from the group consisting of o-Nitrodiphenylamine
4'-methoxy-2-nitrodiphenylamine
2-nitrodiphenylamine
2'-chloro-2-nitrodiphenylamine
4'-methyl-2-nitrodiphenylamine
2-nitrobiphenyl
9-(o-nitrophenyl)-carbazole
(2-nitrophenyl)-1-naphthylamine
o-Nitrodiphenyl
o-Nitrodiphenylmethane
o-Nitroacetanilide, respectively, which method comprises heating the nitro compound with a metal chosen from the group consisting of aluminum, antimony, cobalt, copper, iron, lead, magnesium, nickel, tin, zinc, and sodium under such conditions that hydrogen is not furnished to the reaction until the corresponding heterocyclic compound is formed, and thence recovering the heterocyclic compound.

14. The process of manufacturing a heterocyclic compound chosen from the group consisting of Phenazine
2-methoxyphenazine
1-chlorophenazine
2-methylphenazine
Carbazole
1,9-dihydrophenazinocarbazole
1,2-benzophenazine
Phenoxazine
Acridine
2-methylbenzimidazole from the corresponding nitro compound chosen from the group consisting of o-Nitrodiphenylamine
4'-methoxy-2-nitrodiphenylamine
2-nitrodiphenylamine
2'-chloro-2-nitrodiphenylamine
4'-methyl-2-nitrodiphenylamine
2-nitrobiphenyl
9-(o-nitrophenyl)-carbazole
(2-nitrophenyl)-1-naphthylamine
o-Nitrodiphenyl
o-Nitrodiphenylmethane
o-Nitroacetanilide, respectively, which method comprises heating the nitro compound with chromous oxide under such conditions that hydrogen is not furnished to the reaction until the corresponding heterocyclic compound is formed, and thence recovering the heterocyclic compound.

15. The process of manufacturing a phenazine, comprising heating in a dry state an o-nitrodiphenylamine with an oxygen acceptor under such conditions that hydrogen is not furnished to the reaction until the phenazine is formed, and thence recovering the phenazine.

16. The process of manufacturing a phenazine, comprising heating an o-nitrodiphenylamine with a metal chosen from the group consisting of aluminum, antimony, cobalt, copper, iron, lead, magnesium, nickel, tin, zinc and sodium under such conditions that hydrogen is not furnished to the reaction until the phenazine is formed, and thence recovering the phenazine.

17. The process of manufacturing a phenazine, comprising heating an intimate mixture of an o-nitrodiphenylamine and carbon under such conditions that hydrogen is not furnished to the reaction until the phenazine is formed, and thence isolating the phenazine.

18. The process of manufacturing a phenazine, comprising heating an intimate mixture of an o-nitrodiphenylamine and iron under such conditions that hydrogen is not furnished to the reaction until the phenazine is formed.

19. The process of manufacturing a phenazine, comprising heating an intimate mixture of an o-nitrodiphenylamine and lead under such conditions that hydrogen is not furnished to the reaction until the phenazine is formed.

20. The process of manufacturing phenazine, comprising heating o-nitrodiphenylamine with carbon until the phenazine is formed, and thence recovering the phenazine.

21. The process of manufacturing a phenazine, comprising heating an intimate mixture of an o-nitrodiphenylamine and aluminum until the phenazine is formed, and thence isolating the phenazine.

22. The process of manufacturing a phenazine comprising heating in a dry state a 2-2'-dinitrodiphenylamine with an oxygen acceptor under such conditions that hydrogen is not furnished to the reaction until the phenazine is formed, and thence isolating the phenazine.

23. The process of manufacturing phenazine comprising heating in a dry state an o-nitrodiphenylamine with an oxygen acceptor under such conditions that hydrogen is not furnished to the reaction until the phenazine is formed, and thence recovering the phenazine.

24. The method of manufacturing phenazine comprising heating in a dry state an intimate mixture of 2-2'-dinitrophenylamine and comminuted iron until phenazine is formed, thence recovering the phenazine.

25. The process of manufacturing 2-methoxyphenazine comprising heating in a dry state 4'-methoxy-2-nitrodiphenylamine with an oxygen acceptor under such conditions that hydrogen is not furnished to the reaction until the 2-methoxyphenazine is formed, and thence recovering the 2-methoxyphenazine.

26. The process of manufacturing 1-chlorophenazine comprising heating in a dry state 2'-chloro-2-nitrodiphenylamine with an oxygen acceptor under such conditions that hydrogen is not furnished to the reaction until the reaction is complete, and recovering the 1-chlorophenazine.

27. The process of manufacturing 2-methylphenazine comprising heating 4'-methyl-2-nitrodiphenylamine in a dry state with an oxygen acceptor under such conditions that hydrogen is not furnished to the reaction until the reaction is complete, and thence recovering the 2-methylphenazine.

28. The process of manufacturing 2-chlorophenazine comprising heating in a dry state 4'-chloro-2-nitrodiphenylamine with an oxygen acceptor under such conditions that hydrogen is not furnished to the reaction until the reaction is complete.

29. The process of manufacturing a carbazole comprising heating a 2-nitrobiphenyl in a dry state with an oxygen acceptor under such conditions that hydrogen is not furnished to the reaction until the reaction is complete, and thence recovering the carbazole.

30. The method of manufacturing 1,9-dihydrophenazinocarbazole comprising heating in a dry state 9-(o-nitrophenyl)-carbazole with an oxygen acceptor under such conditions that hydrogen is not furnished to the reaction until the reaction is complete, and thence recovering the 1,9-dihydrophenazinocarbazole.

31. The method of manufacturing 1,2-benzophenazine comprising heating in a dry state (2-nitrophenyl)-1-naphthylamine with an oxygen acceptor under such conditions that hydrogen is not furnished to the reaction until the reaction is complete, and thence recovering the 1,2-benzophenazine.

32. The method of manufacturing phenoxazine comprising heating in a dry state o-nitrodiphenyl ether with an oxygen acceptor under such conditions that hydrogen is not furnished to the reaction until the reaction is complete, and thence recovering the phenoxazine.

33. The method of manufacturing acridine comprising heating in a dry state o-nitrodiphenylmethane with an oxygen acceptor under such conditions that hydrogen is not furnished to the reaction until the reaction is complete, and thence recovering the acridine.

34. The method of manufacturing 2-methylbenzimidazole comprising heating in a dry state o-nitroacetanilide with an oxygen acceptor under such conditions that hydrogen is not furnished to the reaction until the reaction is complete, and thence recovering the 2-methylbenzimidazole.

35. The process of manufacturing 2-chlorophenazine comprising heating in a dry state 4'-chloro-2-nitrodiphenylamine with iron in finely divided form until the reaction is complete, and thence recovering the 2-chlorophenazine.

36. The process of manufacturing 1-chlorophenazine comprising heating 2'-chloro-2-nitrodiphenylamine with finely divided lead, said materials being intimately mixed in a dry state, until the reaction is complete, and thence recovering the 1-chlorophenazine.

37. The process of manufacturing 2-methoxyphenazine comprising heating in a dry state 4'-methoxy-2-nitrodiphenylamine with carbon until the reaction is complete, and thence recovering the 2-methoxyphenazine.

38. The process of manufacturing 2-methoxyphenazine comprising heating 4'-methoxy-2-nitrodiphenylamine with carbon in a dry state until the reaction is complete, adding acetone to the reaction mixture, filtering out the carbon, thence evaporating the acetone from the filtrate and recovering the 2-methoxyphenazine.

39. The method of manufacturing 2-methylphenazine comprising heating a dry intimate mixture of 4'-methyl-2-nitrodiphenylamine with amalgamated aluminum powder until the reaction is complete, and recovering the 2-methylphenazine from the reaction mixture.

40. The method of manufacturing carbazole comprising heating a dry intimate mixture of 2-nitrobiphenyl and ferrous oxalate until the carbazole is formed, thence recovering the carbazole from the reaction mixture.

41. The method of manufacturing 1,9-dihydrophenazinocarbazole which comprises heating in a dry state 9-(o-nitrophenyl)-carbazole and ferrous oxalate until the reaction is complete, and thence recovering from the reaction mixture 1,9-dihydrophenazinocarbazole.

42. The method of manufacturing 1,2-benzophenazine comprising heating in a dry state (2-nitrophenyl)-1-naphthylamine and iron until the reaction is complete and thence recovering from the reaction mixture the 1,2-benzophenazine.

43. The method of manufacturing phenoxazine comprising heating in a dry state o-nitrodiphenyl ether with sodium amalgam until the reaction is complete, and thence isolating from the reaction mixture the phenoxazine.

44. The method of manufacturing acridine comprising heating in a dry state a mixture of o-nitrodiphenylmethane and iron until the reaction is complete, and thence recovering the acridine from the reaction mixture.

45. The method of manufacturing 2-methylbenzimidazole comprising heating ferrous oxalate to form a mixture of iron and ferrous oxide, cooling the mixture in the absence of oxygen, adding o-nitroacetanilide, heating the new mixture until 2-methylbenzimidazole is formed, and thence recovering the formed product from the reaction mixture.

46. The process comprising reacting an o-nitroacylanilide with an oxygen acceptor by heating them together under such conditions that hydrogen is not furnished to the reaction until the reaction is complete, and thence recovering the reaction product formed.

47. The method of manufacturing a heterocyclic compound of the class

from a nitro compound of the class

in both of which compounds R and R' are aromatic nuclei and —B— is a bridge linkage connecting said radicals, which method comprises heating the nitro compound with ferrous oxide under such conditions that hydrogen is not furnished to the reaction until the heterocyclic compound is formed, and thence recovering the heterocyclic compound.

48. The method of manufacturing a heterocyclic compound of the class

from a nitro compound of the class

in both of which compounds R and R' are aromatic nuclei and —B— is a bridge linkage connecting said radicals, which method comprises heating the nitro compound with ferrous oxalate under such conditions that hydrogen is not furnished to the reaction until the heterocyclic compound is formed, and thence recovering the heterocyclic compound.

49. The method of manufacturing a heterocyclic compound of the class

from a nitro compound of the class

in both of which compounds R and R' are aromatic nuclei and —B— is a bridge linkage connecting said radicals, which method comprises heating the nitro compound with lead suboxide under such conditions that hydrogen is not furnished to the reaction until the heterocyclic compound is formed, and thence recovering the heterocyclic compound.

50. The process of manufacturing a heterocyclic compound chosen from the group consisting of Phenazine
    2-methoxyphenazine
    1-chlorophenazine
    2-methylphenazine
    Carbazole
    1,9-dihydrophenazinocarbazole
    1,2-benzophenazine
    Phenoxazine
    Acridine
    2-methylbenzimidazole from the corresponding nitro compound chosen from the group consisting of o-Nitrodiphenylamine
    4'-methoxy-2-nitrodiphenylamine
    2-nitrodiphenylamine
    2'-chloro-2-nitrodiphenylamine
    4'-methyl-2-nitrodiphenylamine
    2-nitrobiphenyl
    9-(o-nitrophenyl)-carbazole
    (2-nitrophenyl)-1-naphthylamine
    o-Nitrodiphenyl
    o-Nitrodiphenylmethane
    o-Nitroacetanilide, respectively, which method comprises heating the nitro compound with ferrous oxide under such conditions that hydrogen is not furnished to the reaction until the corresponding heterocyclic compound is formed, and thence recovering the heterocyclic compound.

51. The process of manufacturing a heterocyclic compound chosen from the group consisting of Phenazine
    2-methoxyphenazine
    1-chlorophenazine
    2-methylphenazine
    Carbazole
    1,9-dihydrophenazinocarbazole
    1,2-benzophenazine
    Phenoxazine
    Acridine
    2-methylbenzimidazole from the corresponding nitro compound chosen from the group consisting of o-Nitrodiphenylamine
    4'-methoxy-2-nitrodiphenylamine
    2-nitrodiphenylamine
    2'-chloro-2-nitrodiphenylamine
    4'-methyl-2-nitrodiphenylamine
    2-nitrobiphenyl
    9-(o-nitrophenyl)-carbazole
    (2-nitrophenyl)-1-naphthylamine
    o-Nitrodiphenyl
    o-Nitrodiphenylmethane
    o-Nitroacetanilide, respectively, which method comprises heating the nitro compound with ferrous oxalate under such conditions that hydrogen is not furnished to the reaction until the corresponding heterocyclic compound is formed, and thence recovering the heterocyclic compound.

52. The process of manufacturing a heterocyclic compound chosen from the group consisting of Phenazine
    2-methoxyphenazine
    1-chlorophenazine
    2-methylphenazine
    Carbazole
    1,9-dihydrophenazinocarbazole
    1,2-benzophenazine
    Phenoxazine
    Acridine
    2-methylbenzimidazole from the corresponding nitro compound chosen from the group consisting of o-Nitrodiphenylamine
    4'-methoxy-2-nitrodiphenylamine
    2-nitrodiphenylamine
    2'-chloro-2-nitrodiphenylamine
    4'-methyl-2-nitrodiphenylamine
    2-nitrobiphenyl
    9-(o-nitrophenyl)-carbazole
    (2-nitrophenyl)-1-naphthylamine
    o-Nitrodiphenyl
    o-Nitrodiphenylmethane
    o-Nitroacetanilide.

respectively, which method comprises heating the nitro compound with lead suboxide under such conditions that hydrogen is not furnished to the reaction until the corresponding heterocyclic compound is formed, and thence recovering the heterocyclic compound.

HENRY C. WATERMAN.
                DONALD L. VIVIAN.